US006272725B1

(12) United States Patent
Stout, Jr.

(10) Patent No.: US 6,272,725 B1
(45) Date of Patent: Aug. 14, 2001

(54) INSERT AND METHOD OF REPAIRING A MOTORCYCLE CLUTCH USING AN INSERT

(76) Inventor: Norman D. Stout, Jr., R.R. #2 Box 471, Ruffs Dale, PA (US) 15679

( * ) Notice: Subject to any disclaimer, the term of this patent is extended or adjusted under 35 U.S.C. 154(b) by 0 days.

(21) Appl. No.: 09/390,034

(22) Filed: Sep. 3, 1999

Related U.S. Application Data

(63) Continuation-in-part of application No. PCT/US99/00284, filed on Jan. 7, 1999.
(60) Provisional application No. 60/070,824, filed on Jan. 8, 1998.

(51) Int. Cl.[7] ................................ B23P 6/00; B23P 19/04
(52) U.S. Cl. ...................... 29/402.06; 29/402.03; 29/402.09; 192/70.2
(58) Field of Search ........................... 29/402.03, 402.04, 29/402.05, 402.06, 402.09, 402.11; 192/70.12, 70.2, 70.19, 113.34

(56) References Cited

U.S. PATENT DOCUMENTS

| | | | | |
|---|---|---|---|---|
| 3,191,735 | * | 6/1965 | Wavak | 192/70.2 |
| 3,650,357 | * | 3/1972 | Nelson et al. | 188/73.2 |
| 4,083,434 | * | 4/1978 | Pinter | 188/73.2 |
| 4,574,449 | * | 3/1986 | Wussow | 29/402.06 |
| 4,890,700 | * | 1/1990 | Guichard | 188/73.2 |
| 5,560,452 | * | 10/1996 | Labougle | 192/107 R |

* cited by examiner

Primary Examiner—S. Thomas Hughes
Assistant Examiner—Jermie E. Cozart
(74) Attorney, Agent, or Firm—Nils H. Ljungman & Associates

(57) ABSTRACT

A repair kit for a motor vehicle friction clutch, for example a motorcycle friction clutch, that is economical, simple to install, and which can extend the life of the original outer clutch hub, and a method for repairing the friction clutch. The kit can include an insert for insertion into the clutch. Additionally the kit can provide for the hardening of gear teeth in the clutch without the use of an insert. Additionally, a method for repairing a motorcycle friction clutch using a motorcycle clutch repair kit.

19 Claims, 6 Drawing Sheets

INSERT AND METHOD OF REPAIRING A MOTORCYCLE CLUTCH USING AN INSERT

CONTINUING APPLICATION DATA

This application is a Continuation-In-Part application of International Application No. PCT/US99/00284, which was filed on Jan. 7, 1999, and which claims priority from U.S Provisional Application No. 60/070,824, filed on Jan. 8, 1998. International Application No. PCT/US99/00284 was pending as of the filing date of this application. The United States was an elected state in International Application No. PCT/US99/00284.

BACKGROUND OF THE INVENTION

1. Field of the Invention

The present invention relates to a repair device and a method for using the repair device for the clutches used in off-road vehicles such as motorcycles and quads.

2. Background Information

The clutches used in off-road vehicles such as motorcycles and quads and certain other vehicles, are typically run in oil and are often referred to as "wet clutches." In other words, the clutch in these vehicles is typically lubricated by oil. The clutch's function is to engage and/or disengage the power from the engine and the transmission.

A common problem with this type of clutch is the occurrence of a "dragging" clutch. A dragging clutch is one that does not disengage properly. This dragging clutch problem can often occur where the friction plates wear grooves in the outer clutch hub due to continuous or continual use of the clutch. Known solutions entail filing or machining the grooves from the surface of the outer clutch hub, which tend to be temporary and limited solutions. Alternatively, the outer clutch hub could be replaced, which tends to be an expensive solution compared to a repair of the friction clutch.

OBJECT OF THE INVENTION

An object of the present invention is to provide a repair kit for a motor vehicle friction clutch, for example a motorcycle friction clutch, that is economical, simple to install, and which can extend the life of the original outer clutch hub. An additional object of the present invention is to provide a method for the repair of a wet friction clutch using a clutch repair kit. An additional object of the present invention is to provide a method for the repair of a motor vehicle friction clutch which involves hardening the outer clutch hub without the addition of additional inserts.

SUMMARY OF THE INVENTION

At least one embodiment of the present invention can yield these objects by providing a clutch repair kit for the repair of the friction clutch. Specifically, the kit can include an inset, as described below, for insertion into the clutch. Additionally, the kit can provide a cut-out for use in the clutch. Additionally, in at least one embodiment of the present invention, the-kit can provide for the hardening of gear teeth in the clutch without the use of an insert. Additionally, the invention includes a method of repairing the friction clutch in a motor vehicle such as a motorcycle using an embodiment of an insert.

The above discussed embodiments of the present invention will be described further hereinbelow with reference to the accompanying figures. When the word "invention" is used in this specification, the word "invention" includes "inventions," that is, the plural of "invention." By stating "invention," the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

At least one embodiment of the present invention is described herein with reference to the accompanying figures, wherein.

DESCRIPTION OF THE PREFERRED EMBODIMENT

Figure 1:
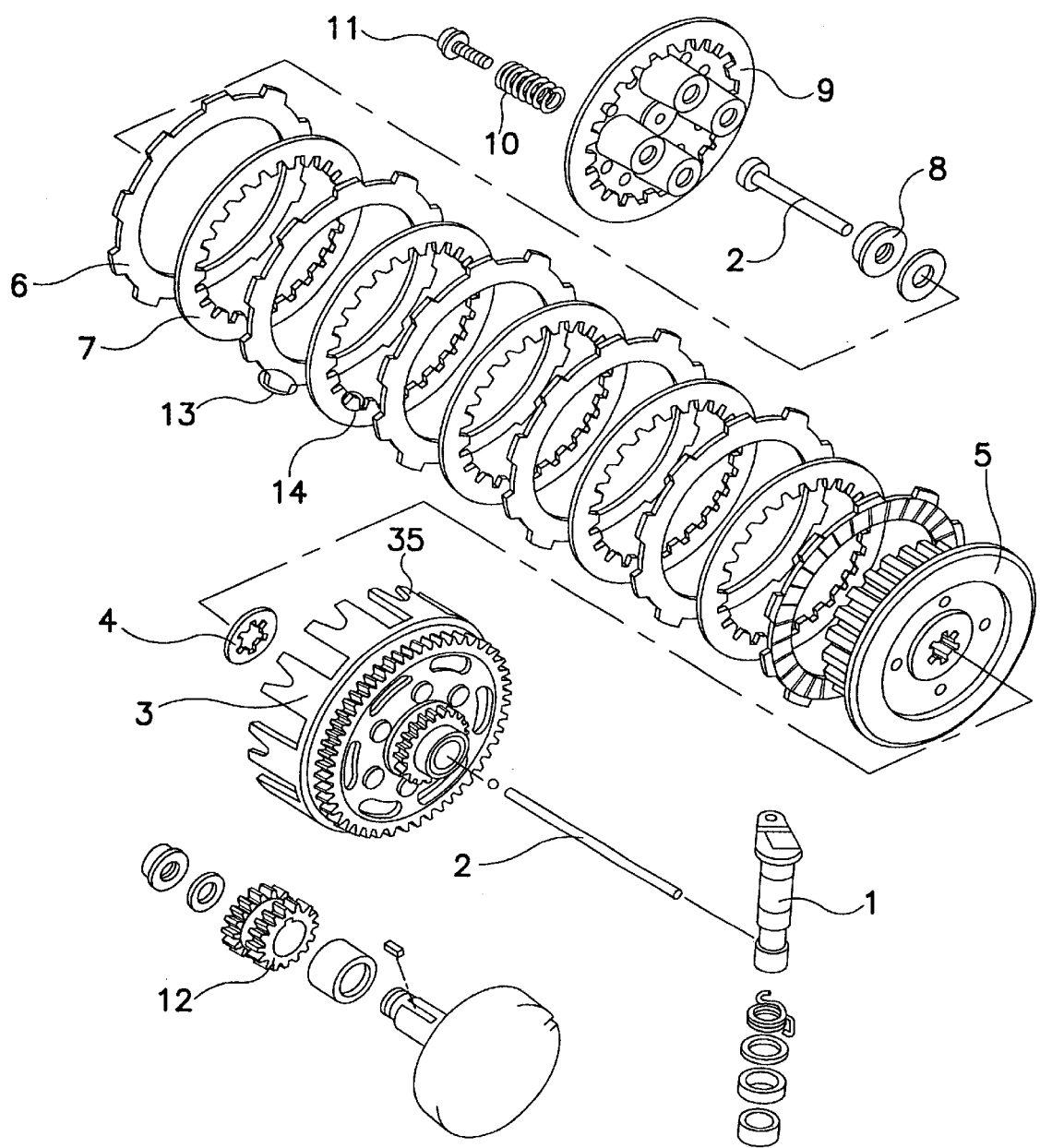
FIG. 1 shows an expanded view of the components of a clutch assembly such as a clutch assembly for a motorcycle.

FIG. 1 shows an expanded view of a friction clutch assembly such as a friction clutch for a motorcycle. The friction clutch can have an inner clutch hub 5 and can define an axis about which the inner clutch hub 5 can be disposed. Adjacent the inner clutch hub 5 can be a series of at least one steel plate 7 and at least one friction plate 6. The at least one friction plate 6 and the at least one steel plate 7 can alternate in series next to the inner clutch hub 5. Each of the steel plates 7 can have teeth or steel plate teeth 14 disposed inward, or toward the axis of the inner clutch hub. The friction plates 6 can have tabs or projections or friction plate tabs 13 which project outward from the friction plates 6, or in other words away from the axis of the inner clutch hub.

A push rod 2 can be disposed through the inner clutch hub 5 and through the steel plates 7 and friction plates 6. A locknut 8 can hold the push rod 2 with respect to the inner clutch hub 5. A pressure plate 9 can be disposed adjacent the series of friction plates 6 and steel plates 7, opposite the inner clutch hub 5. Clutch spring bolts 11 and clutch springs 10 can be provided to bias the pressure plate 9.

On the side of the inner clutch hub 5 opposite the series of steel plates 7 and friction plates 6, can be an outer clutch hub 3. The outer clutch hub 3, in essence, can be disposed about the inner clutch hub 5 and the plates 6, 7. A spacer 4 can be disposed about the push rod 2 between the inner clutch hub 5 and the outer clutch hub 3. An actuating lever 1, and associated components, can be positioned to actuate the friction clutch. A drive gear 12 can be positioned to engage the friction clutch.

When the clutch is installed in the engine, the first component placed in the engine can be the outer clutch hub 3, which outer clutch hub 3 can be designed with a gear connected, for example riveted, to it. This gear can be driven by the drive gear 12, which drive gear 12 can be located on the crankshaft of the engine (not shown). The gearing arrangement can make the outer clutch hub 3 turn substantially continuously while the engine is running. The inner clutch hub 5 has, for example splines or teeth, to connect or secure the inner clutch hub 5 to the transmission shaft. The inner clutch hub 5 rotates substantially only while the clutch is engaged.

When installing the friction clutch, the outer clutch hub 3, spacer 4 and inner clutch hub 5 can be slid onto the transmission output shaft and held securely in place with a lock nut. Once the inner 5 and outer 3 clutch hubs are in place, the clutch plates 6, 7 can be installed. The friction plates 6 can have friction pads or friction material bonded to both sides of the friction plates, and as discussed above, can have a series of tabs 13, projecting radially outward to secure the friction plates 6 to the outer clutch hub 3. The flat steel plates or spacer plates 7, as discussed above, can have a series of teeth 14 to engage the inner clutch hub 5. The friction plates 6 and steel plates 7 should be installed in alternating order with one of the friction plates 6 nearest the inner clutch hub 5. The first plate and last plate are typically always friction plates 6.

The push rod 2 can then be installed by sliding into a hole in the end of a transmission output shaft. The pressure plate 9 can then be placed at the end of the clutch hubs 3, 5. Then, the clutch springs 10 and bolts 11 can be installed, which can tightly press or compress the pressure plate 9 against the clutch plates 6, 7. The assembled clutch can be engaged and disengaged by the movement of the actuating lever 1, which can be located on the side of the engine. The movement of the actuating lever 1 can be controlled by a clutch lever 30 which can be located on handlebars of the vehicle, and which can be connected to the actuating lever 1 by a clutch cable. The normal operating position for the clutch lever 30 is typically "out" or away from the handlebar when the clutch is engaged, (in other words, when the friction plates that are secured to the outer clutch hub and the steel plates that are secured to the inner clutch hub are pressed tightly together by the clutch springs pushing on the pressure plate which allows the inner clutch hub and the outer clutch hub to turn simultaneously to allow the power from the engine to be transferred to the inner clutch hub which is connected to the transmission by way of a splined output shaft.) Typically, when the clutch lever 30 is pulled "into" the handlebar the clutch is disengaged (when the clutch lever is pulled this can turn the actuating arm by way of a clutch cable which can move the push rod against the pressure plate, the pushing motion continuing until the pressure plate has released substantially all pressure applied to the clutch plate). This can allow the clutch plates 6, 7 to separate and can allow the inner clutch hub 5 and the outer clutch hub 3 to turn separately which stops the power from the engine and outer clutch hub 3 from being transmitted to the inner clutch hub 5 which is connected to the transmission by way of the splined output shaft. The engaging and disengaging of the clutch can be done at the discretion of the rider, by pulling or releasing the clutch lever 30.

Figure 2:
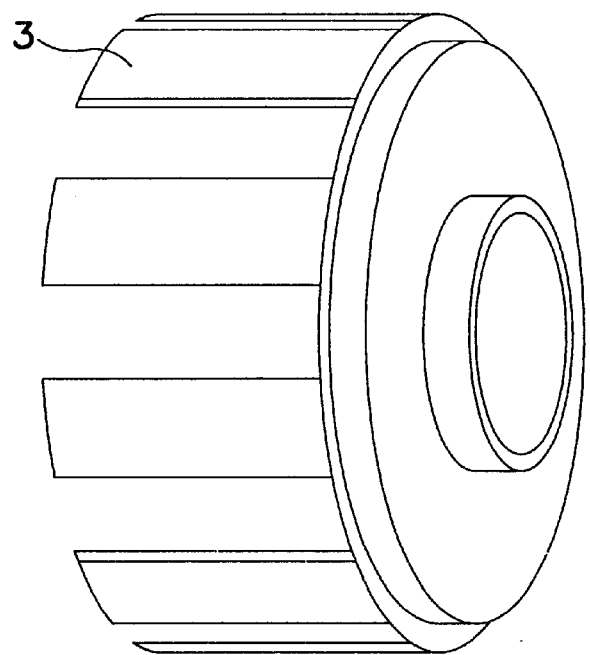
FIG. 2 shows a new outer clutch hub.
Figure 3:
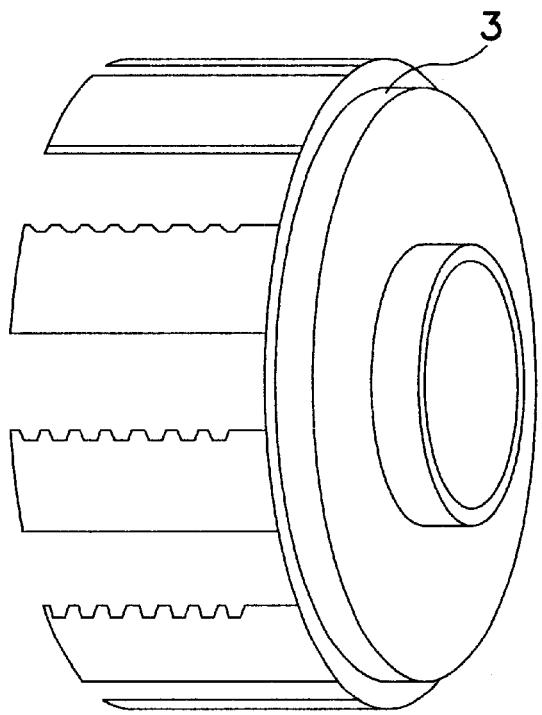
FIG. 3 shows a used outer clutch hub indicating wear.

The clutch is a necessary component of these vehicles and is most commonly used when starting, stopping or shifting gears of the transmission. Due to the substantially continuous use of the clutch, as it is regularly being engaged and disengaged, the friction plate tabs 13 can wear grooves into the outer clutch hub 3 fingers or projections 35. FIG. 2 schematically illustrates a new clutch hub, and FIG. 3 schematically illustrates a worn clutch hub. When the friction plate tabs 13 become "seated" into grooves that have been worn into the outer clutch hub 3, this can prevent the clutch plates 6, 7 from fully separating when the clutch is disengaged which can cause the clutch to "drag" which can cause difficulty stopping the vehicle and which can also cause difficulty shifting the gears.

Figure 6:
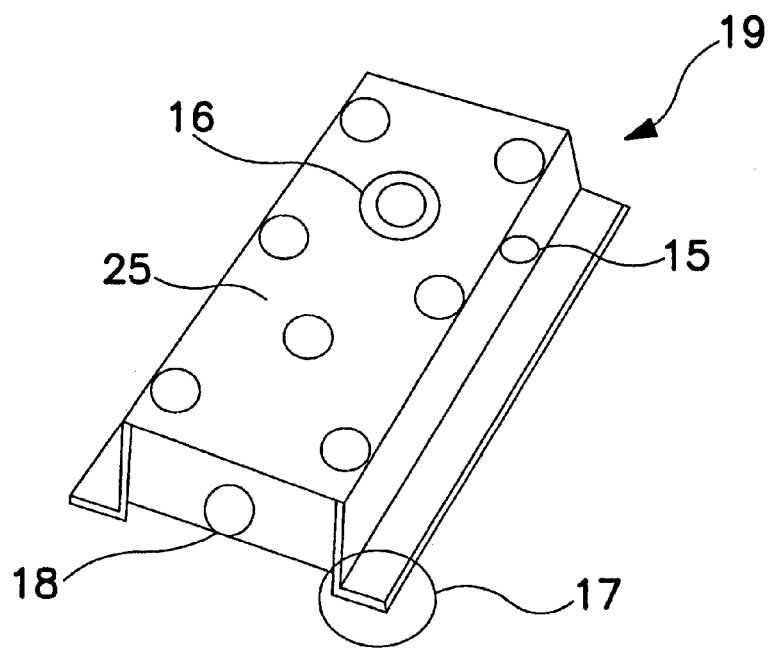
FIG. 6 shows an embodiment of an insert for repairing a friction a clutch.

An embodiment of an insert 19 to be used in repair of the clutch is illustrated in FIG. 6. The insert 19 can be made of a thin steel sheet and can be made into a specific shape. The shape can be achieved, for example, by stamping, forming, machining or other processes which could provide the desired shape. Lower rails 17 of the insert 19 can be designed to secure the insert 19 to the outer clutch hub 3. End plates 18 of the insert 19 can be designed to substantially prevent the insert 19 from sliding out of the outer hub 3. The insert faces or wear faces 15 can substantially prevent the friction plates 6 (and their tabs 13) from wearing grooves in the outer hub 3. As the clutch can run in oil, holes or flow holes 16 can be provided in the insert 19 to prevent oil from building up in the insert 19.

In at least one embodiment of the present invention, a base 25 of the insert 19 can have a length of about 36 mm and a width of about 14 mm. The thickness can be about 1 mm or less. The end plates 18 of the insert 19 can have a width of about 14 mm and a height of about 4.5 mm. The sides or wear faces 15 can have a length of about 36 mm and a height of about 4.5 mm. The lower rails or flanges 17 can have, for example, a length of about 36 mm and a width of about 2 mm.

It is also possible, in embodiments of the present invention, that the side flanges or lower rails 17 are not substantially parallel to the base plate 25. In this case it would be possible for the side walls or wear faces 15 to have a height of about 4.5 mm at one end and a height of about 4 mm at the opposing end.

In at least one embodiment of the present invention, there can be about 8 flow holes through the base of the insert to allow the passage of oil through the insert, and the holes can each have a diameter of about 4.5 mm.

Other dimensions are possible within the scope of the invention to allow for differing clutch sizes and specifically differing sizes of the outer clutch hub 3, friction plates 6, and friction plate tabs 13.

Figure 4:
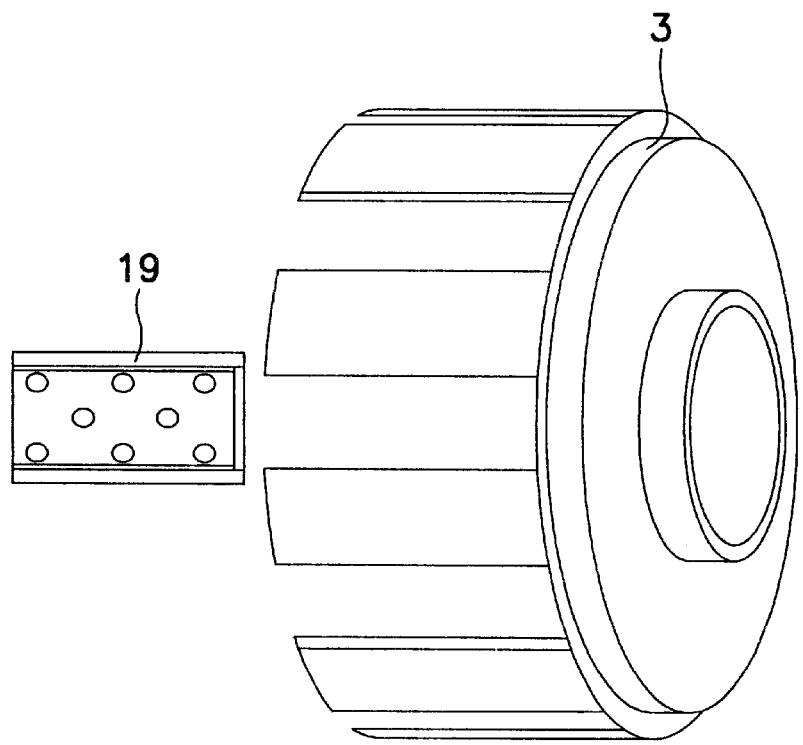
FIG. 4 shows a machined outer clutched hub.
Figure 5:
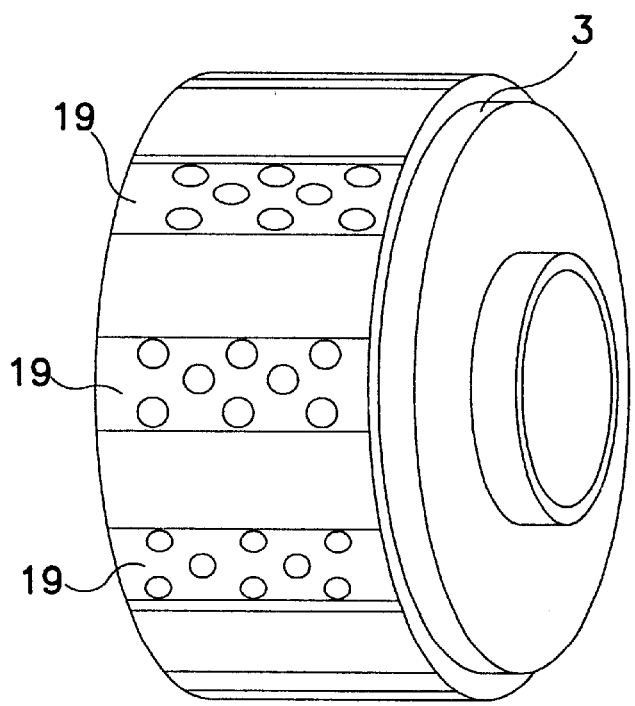
FIG. 5 shows an outer clutch hub with inserts installed.

For the insert to be installed, the fingers 35 of the outer clutch hub 3 must be filed or machined to a specific size. To do this, the clutch assembly must be removed from the engine. In the process of filing or machining the hub fingers 35, usually the grooves in the hub fingers 35 are removed. Once all the hub fingers 35 are properly machined or filed to size, the inserts are ready to be installed (see FIG. 4). The inner 5 and outer 3 hubs can be reinstalled on the engine. The clutch plates 6, 7 can be assembled in a stack in the order they are to be installed, i.e. friction plate, steel plate, friction plate etc. The tabs 13 on the friction plates 6 should be aligned with one another when stacking the plates 6, 7. The inserts 19 can then be positioned over the friction plate tabs 13. All friction plate tabs 13 should be installed between the end plates 18 of the insert 19, if the insert 19 has two end plates 18 (see FIG. 5). If the insert 19 only has one end plate 18, then the end plate 18 should be disposed outside of the friction plate tabs. For convenience while installing the inserts 19, opposing inserts 19 can be installed first and then a retaining device, for example a rubber band, can be placed about the installed inserts 19 to hold them in position while the remainder of the inserts 19 are installed. When all inserts 19 are installed, the clutch plates 6, 7, with inserts 19, can be installed in the clutch hubs. If the retaining device (for example a rubber band or elastic band) was used, the retaining device can be removed when the clutch plates 6, 7 are, for example, approximately half way or further into position. The remainder of the clutch components can be reinstalled after the clutch plates 6, 7 and hubs 3, 5 are assembled.

Figure 7:
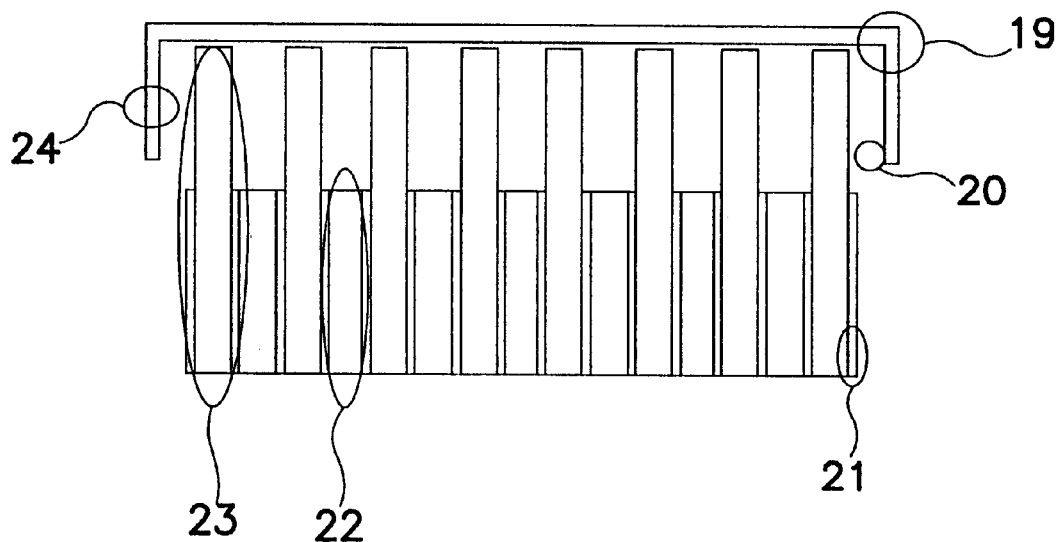
FIG. 7 shows a side view of clutch plates with inserts installed.

FIG. 7 illustrates a side view of embodiments of clutch plates 22, 23 with an embodiment of an insert 19 installed on the friction plate tabs 13. The inserts. 19 can be designed to allow a space 20 between the plates 22, 23 and the end plate 24 of the insert. This space 20 can allow space for the clutch plates 22, 23 to separate during operation. The friction lining or friction material 21 is also shown on the friction plates 23.

Figure 8:
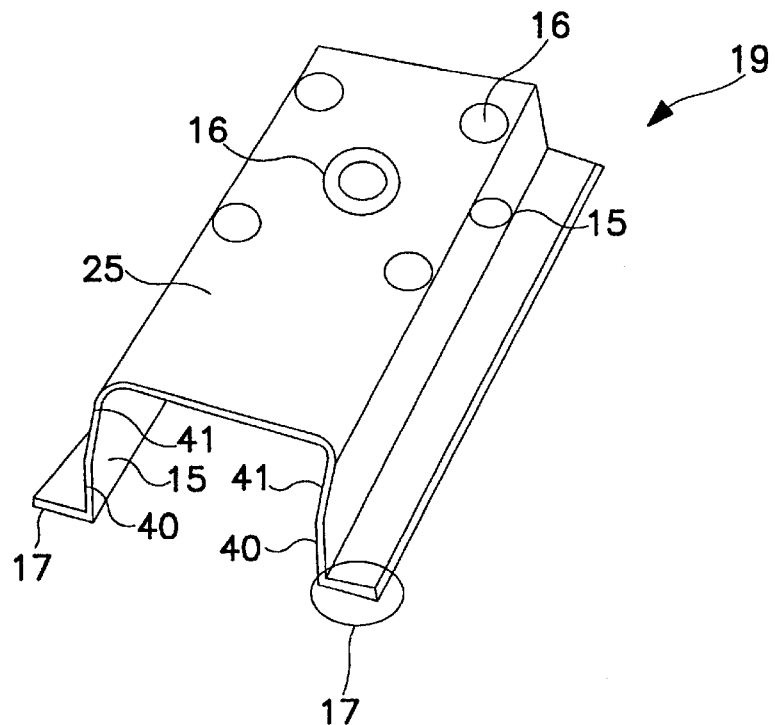
FIG. 8 shows an embodiment of an insert for repair of a clutch.

FIG. 8 illustrates another view of a possible insert 19. In this embodiment, at least one of the end plates or faces 18 has been removed.

Figure 9:
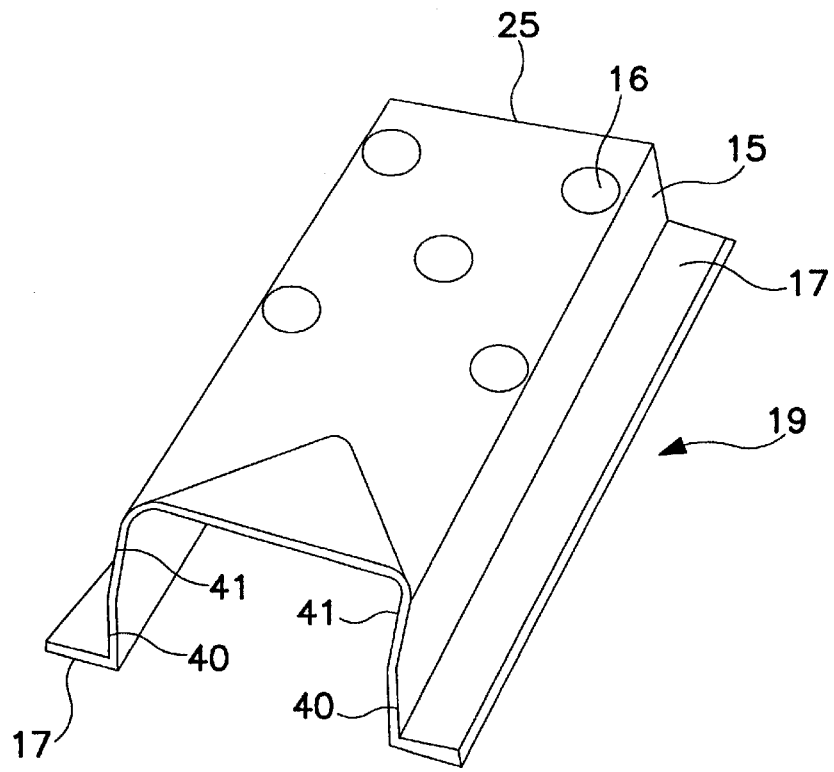
FIG. 9 shows an embodiment of an embodiment of an insert for repair of a clutch.
Figure 10:
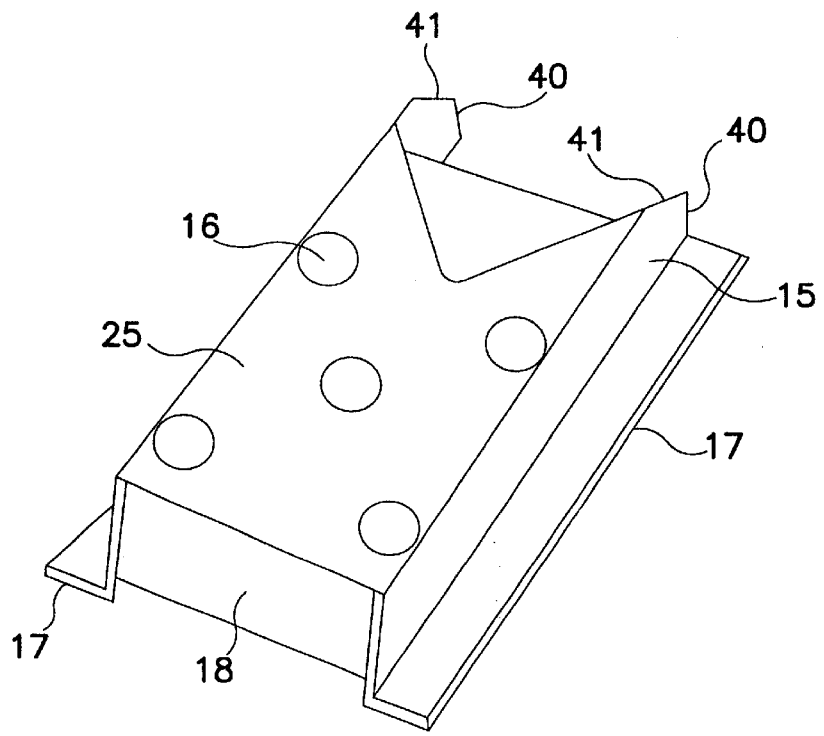
FIG. 10 shows another view of an embodiment of an insert for repair of a clutch.

FIGS. 9 and 10 illustrate another possible clutch insert 19 with a slightly different design. In this insert 19, only one end face 18 is used, and the wear faces 15 are cut to recede at an angle from the open end. Additionally, the substantially triangular section illustrated in FIGS. 9 and 10 can also be cut away from the insert as shown as an alternative embodiment illustrated in FIG. 11. The embodiments illustrated in FIGS. 8, 9 and 10 can possibly ease installation of the insert in the clutch because of the open end.

In at least one embodiment of the present invention as shown in FIGS. 9 and 10, the base 25 can have a length of about 30 mm and a width of about 14 mm. The end plate 18 can have a width of about 14 mm and a height of about 4 mm. The side walls or wear faces 15 can have a length of about 36 mm at their longest point and about 30 or 31 mm at their shortest point. The cut-away end of the side walls can have a straight taper from their longest to their shortest point or can have a section 40 substantially perpendicular to the flanges or lower rails 17 and then another section 41 that tapers to the shortest point. In such an embodiment, the section 40 perpendicular to the lower rails 17 can be about 2.5 mm and the tapered section 41 can be about 4 mm. The tapered section 41 can be between the base plate 25 and the perpendicular section 40. The lower rails 17 can be about 38 mm long and about 2 mm wide.

In at least one embodiment of the present invention as described above, there can be, for example 5 flow holes 16 through the base plate 25, and, for example, the flow holes 16 can have a diameter of about 4.5 mm.

It is also possible in embodiments of the present invention, that the lower rails 17 are not parallel to the base plate 25 but instead are at a slight angle with respect to the base plate 25. In this case, for example, the side walls or wear faces 15 can have a height of about 4.5 mm at the end adjacent the end plate 18, and a height of about 4 mm at the open end.

Figure 11:
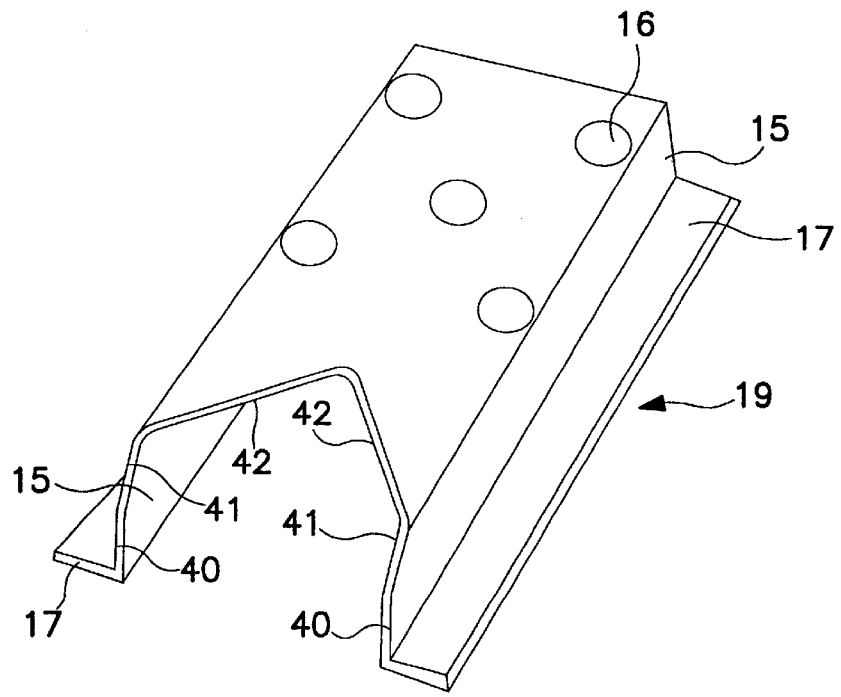
FIG. 11 shows another embodiment of an insert for repair of a motor vehicle clutch.

In possible embodiments of the present invention, as shown for example in FIG. 11, it is possible for the base plate 25 to contain an additional substantially triangular cut-away section. The cut-away section can be substantially symmetrical about the center of the insert, and each side of the triangular cut-away section 42 can have a length of about 6 mm.

In other alternative embodiments of the present invention, it may be possible to use inserts with alternative arrangements and sizes of oil holes or possibly without the oil holes.

In other embodiments of the present invention, it may be possible to repair the clutch without using separate inserts by instead hardening the surfaces of the clutch hub projections 35. For example the projections could be surface treated or otherwise processed to increase the resistance to scoring of the material. This could provide the function of the inserts without requiring the installation of the additional components.

While the description above has generally referred to the repair of wet friction clutches, it is within the scope of the present invention to include inserts, as used above, in the initial assembly of a clutch. This could provide the advantage of a longer wearing clutch with less likelihood for the need of repair or replacement of the clutch.

One feature of the present invention can be found in a method for repairing the friction clutch of a motorcycle, said method comprising the steps of: removing the clutch assembly from the engine of the motorcycle; sizing the tabs of the friction plates to the necessary size; installing the clutch hubs in the engine of the motorcycle; assembling the friction plates and steel plates in the proper order; aligning the tabs on the friction plates; positioning the inserts about the friction plate tabs; installing the clutch plates and inserts in the engine; and reinstalling the remainder of the clutch components.

An additional feature of the present invention can be found in an insert for repairing a motorcycle friction clutch, said insert comprising: a base; said base having first and second edges disposed opposite each another; said base comprising at least one hole disposed therethrough; a first wall; said first wall being disposed substantially adjacent said first edge of said base; said first wall being disposed substantially transverse to said base; a second wall; said second wall being disposed substantially adjacent said second edge of said base; said second wall being disposed substantially transverse to said base and substantially parallel to said first wall; an end plate; said end plate being disposed substantially transverse to said base; said end plate being disposed between said first wall and said second wall; and said first wall, said second wall and said base plate being disposed and configured to permit said insert to be disposed about tabs of friction plates of a motorcycle friction clutch.

Yet another feature of the present invention can be found in the insert comprising: a first flange; said first flange being disposed adjacent said first wall; said first flange being substantially transverse to said first wall; said first flange being disposed to project from said first wall away from said base plate; a second flange; said second flange being disposed adjacent said second wall; said second flange being substantially transverse to said second wall; and said second flange being disposed. to project from said second wall away from said base plate.

Examples of clutches and methods of repairing clutches, which may be used in embodiments of the present invention, may be found in the following U.S. Patents which are hereby incorporated by reference herein: U.S. Pat. No. 3,191,735, issued Jun. 29, 1965 to Wavak; U.S. Pat. No. 5,322,148, issued Jun. 21, 1994 to Fernandez; U.S. Pat. No. 3,305,060, issued Feb. 21, 1967 to Zeidler; U.S. Pat. No. 3,757,907, issued Sep. 11, 1973 to Crossman et al.; and U.S. Pat. No. 3,885,291, issued May 27, 1975 to DiChiara.

Additional examples of clutches and components thereof, and methods for installing or repairing clutches, may be found in the following U.S. Patents which are hereby incorporated by reference herein: U.S. Pat. No. 5,176,236, issued Jan. 5, 1993 to Ghidorzi et al.; U.S. Pat. No. 5,199, 542, issued Apr. 6, 1993 to Flotow; U.S. Pat. No. 5,223,882, issued Jun. 29, 1993 to Beckmann; U.S. Pat. No. 5,224,578, issued Jul. 6, 1993 to Rheinheimer et al.; U.S. Pat. No. 5,270,930, issued Dec. 14, 1993 to Ito et al.; U.S. Pat. No. 5,273,672, issued Dec. 28, 1993 to Dasai et al.; U.S. Pat. No. 5,439,087, issued Aug. 8, 1998 to Umezawa; U.S. Pat. No. 5,456,343, issued Oct. 10, 1995 to Murata et al.; U.S. Pat. No. 5,460,255, issued Oct. 24 ,1995 to Quigley; and U.S. Pat. No. 5,383,823, issued Jan. 24, 1995 to Ward et al.

The corresponding U.S. Provisional Application, namely U.S. application Ser. No. 60/070,824, filed on Jan. 8, 1998, having the inventor Norman Stout Jr., from which the present application claims priority, is hereby incorporated by reference as if set forth in its entirety herein.

The corresponding International Application, namely International Application No. PCT/US99/00284, filed on Jan. 7, 1999, is hereby incorporated by reference as if set forth in its entirety herein.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A method for repairing the friction clutch of a motorcycle, said method comprising the steps of:
   removing a clutch assembly from the engine of the motorcycle;
   sizing tabs of friction plates of the clutch assembly to a predetermined size to allow for placement of inserts about the tabs of the friction plates;
   reinstalling clutch hubs of the friction clutch assembly in the engine of the motorcycle;
   assembling the friction plates and steel plates of the friction clutch assembly in the proper order;
   aligning the sized tabs of the friction plates to permit inserts to be placed about the tabs;
   positioning wear resistant inserts about the friction plate tabs;
   installing the clutch plates and inserts in the engine; and
   reinstalling the remainder of the clutch components.

2. An insert for a motorcycle friction clutch, said insert comprising;
   a base;
   said base having first and second edges disposed opposite each other;
   said base comprising at least one hole disposed therethrough;
   a first wall;
   said first wall being disposed substantially adjacent said first edge of said base;
   said first wall being disposed substantially transverse to said base;
   a second wall;
   said second wall being disposed substantially adjacent said second edge of said base;
   said second wall being disposed substantially transverse to said base and substantially parallel to said first wall;
   an end plate;
   said end plate being disposed substantially transverse to said base;
   said end plate being disposed between said first wall and said second wall;
   said first wall, said second wall and said end plate being disposed and configured to permit said insert to be disposed about tabs of friction plates of a motorcycle friction clutch;
   a first flange;
   said first flange being disposed adjacent said first wall;
   said first flange being substantially transverse to said first wall;
   said first flange being disposed to project from said first wall away from said base;
   a second flange;
   said second flange being disposed adjacent said second wall;
   said second flange being substantially transverse to said second wall; and
   said second flange being disposed to project from said second wall away from said base.

3. The insert according to claim 2 wherein:
   said at least one hole through said base is configured to allow oil to pass through said insert; and
   said at least one hole through said base comprises a plurality of holes through said base.

4. The insert according to claim 3 wherein:
   said base comprises a cut-away portion opposite said end plate;
   the ends of said side walls opposite said end plate each comprising a first portion and a second portion;
   said second portion of said opposing ends of each of said side walls being disposed adjacent said base and between said base and said first portion of said opposing end of each of said side walls;
   said first portion of said ends of said side walls each being substantially perpendicular to said base;

said second portion of said ends of said side walls each forming an angle between its respective first portion and said base; and said cut-away portion of said base comprising one of:
a portion recessed from the end of said side walls, said recessed portion being substantially linear between said side walls; and
a portion recessed from the end of said side walls, said recessed portion forming a substantially triangular cut-away portion in said base between said side walls.

5. The insert according to claim 4 wherein said insert comprises steel.

6. The insert according to claim 3 comprising:
a second end plate; and
said second end plate being disposed substantially transverse to said base at the end of said base opposite said first end plate.

7. The insert according to claim 6 wherein:
said base has a length of about 36 mm; and
said base has a width of about 14 mm.

8. The insert according to claim 7 wherein:
each of said first and second flanges has a length of about 36 mm; and
each of said first and second flanges has a width of about 2 mm.

9. The insert according to claim 8 wherein:
each of said first wall and said second wall have a first end and a second end;
said end plate is disposed adjacent said first end of said first wall and adjacent said first end of said second wall;
said first end of said first wall has a greater height than said second end of said first wall; and
said first end of said second wall has a greater height than said second end of said second wall.

10. The insert according to claim 9 wherein:
said first end of said first and second side walls each have a height of about 4.5 mm; and
said second end of said side walls each have a height of about 4 mm.

11. The insert according to claim 8 wherein said first and second side flanges are substantially parallel to said base.

12. The insert according to claim 11 wherein said first and second side walls each have a height of about 4.5 mm.

13. A method for repairing the friction clutch of a motorcycle, with an insert, the insert comprising: a base, the base having first and second edges disposed opposite each other, the base comprising at least one hole disposed therethrough, a first wall, the first wall being disposed substantially adjacent the first edge of the base, the first wall being disposed substantially transverse to the base, a second wall, the second wall being disposed substantially adjacent the second edge of the base, the second wall being disposed substantially transverse to the base and substantially parallel to the first wall, an end plate, the end plate being disposed substantially transverse to the base, the end plate being disposed between the first wall and the second wall, and the first wall, the second wall and the end plate being disposed and configured to permit the insert to be disposed about tabs of friction plates of a motorcycle friction clutch; said method comprising the steps of:
removing the clutch assembly from the engine of the motorcycle;
sizing tabs of friction plates of the clutch assembly to a predetermined size to allow for placement of the inserts about the tabs of the friction plates;
reinstalling clutch hubs of the friction clutch assembly in the engine of the motorcycle;
assembling the friction plates and steel plates of the friction clutch assembly in the proper order;
aligning the sized tabs of the friction plates to permit the inserts to be placed about the tabs;
positioning the wear resistant inserts about the friction plate tabs;
installing the clutch plates and inserts in the engine; and
reinstalling the remainder of the clutch components.

14. The method according to claim 13 wherein the insert further comprises:
a first flange;
the first flange being disposed adjacent the first wall;
the first flange being substantially transverse to the first wall;
the first flange being disposed to project from the first wall away from the base;
a second flange;
the second flange being disposed adjacent the second wall;
the second flange being substantially transverse to the second wall; and
the second flange being disposed to project from the second wall away from the base.

15. The method according to claim 14 wherein:
the at least one hole through the base is configured to allow oil to pass through the insert; and
the at least one hole through the base comprises a plurality of holes through the base.

16. The method according to claim 5 wherein:
the base comprises a cut-away portion opposite the end plate;
the ends of the side walls opposite the end plate each comprise a first portion and a second portion;
the second portion of the opposing ends of each of the side walls being disposed adjacent the base and between the base and the first portion of the opposing end of each of the side walls;
the first portion of the ends of the side walls each being substantially perpendicular to the base;
the second portion of the ends of the side walls each forming an angle between its respective first portion and the base; and
the cut-away portion of the base comprising one of:
a portion recessed from the end of the side walls, the recessed portion being substantially linear between the side walls; and
a portion recessed from the end of the side walls, the recessed portion forming a substantially triangular cut-away portion in the base between the side walls.

17. The method according to claim 16 wherein the insert comprises steel.

18. The method according to claim 17 wherein:
the base has a length of about 36 mm;
the base has a width of about 14 mm;
each of the first and second flanges has a length of about 36 mm; and
each of the first and second flanges has a width of about 2 mm.

19. The method according to claim 18 wherein:
each of the first wall and the second walls have a first end and a second end;

the end plate is disposed adjacent the first end of the first wall and adjacent the first end of the second wall;

the first end of the first wall has a greater height than the second end of the first wall;

the first end of the second wall has a greater height than the second end of the second wall;

the first end of the first and second side walls each have a height of about 4.5 mm; and the second end of the side walls each have a height of about 4 mm.

* * * * *

UNITED STATES PATENT AND TRADEMARK OFFICE
CERTIFICATE OF CORRECTION

PATENT NO. : 6,272,725 B1
DATED : August 14, 2001
INVENTOR(S) : Norman Stout, Jr.

It is certified that error appears in the above-identified patent and that said Letters Patent is hereby corrected as shown below:

<u>Column 2,</u>
Line 32, after "clutch;" delete "and".

<u>Column 4,</u>
Line 3, after "projections" delete "35." and insert -- 35 (see Figure 1). --.

<u>Column 10,</u>
Line 33, claim 16, after "claim", delete "5" and insert -- 15 --.

Signed and Sealed this

Eleventh Day of June, 2002

*Attest:*

JAMES E. ROGAN
*Director of the United States Patent and Trademark Office*

*Attesting Officer*